219-121
MTR04 OR 3,860,783 SR

United States Patent [19] [11] 3,860,783

Schmidt et al. [45] Jan. 14, 1975

[54] ION ETCHING THROUGH A PATTERN MASK

[75] Inventors: Paul Herman Schmidt, Chatham; Edward Guerrant Spencer, Murray Hill, both of N.J.

[73] Assignee: Bell Telephone Laboratories, Incorporated, Murray Hill, N.J.

[22] Filed: Oct. 19, 1970

[21] Appl. No.: 81,756

[52] U.S. Cl. .......... 219/121 EM
[51] Int. Cl. .......... B23k 15/00
[58] Field of Search.... 219/121 EB, 121 EM, 121 R

[56] References Cited

UNITED STATES PATENTS

| | | | |
|---|---|---|---|
| 3,056,881 | 10/1962 | Schwarz | 219/50 |
| 3,118,050 | 1/1964 | Hetherington | 219/117 |
| 3,140,379 | 7/1964 | Schleich et al. | 219/69 |
| 3,178,804 | 4/1965 | Ullery, Jr. et al. | 29/155.5 |
| 3,330,696 | 7/1967 | Ullery, Jr. et al. | 117/212 |
| 3,398,237 | 8/1968 | Paidosh | 219/121 EM X |
| 3,445,926 | 5/1969 | Medved et al. | 219/121 EM X |
| 3,453,723 | 7/1969 | Cecil | 219/121 EB X |

FOREIGN PATENTS OR APPLICATIONS

| | | | |
|---|---|---|---|
| 451,332 | 5/1968 | Switzerland | 219/121 EB |

OTHER PUBLICATIONS

IBM Technical Disclosure "Hole Fabrication by Electron Beam Method," 1 page, August, 1965.

IBM Technical Disclosure "Forming Holes in Printed Circuit Substrates," 1 page, June, 1965.

IBM Technical Disclosure, Vol. 8, No. 1, June, 1965, page 16, "Forming Holes in Printed Circuit Substrates."

*Primary Examiner*—J. V. Truhe
*Assistant Examiner*—G. R. Peterson
*Attorney, Agent, or Firm*—A. N. Friedman

[57] ABSTRACT

A pattern of depressions or holes, defined by a pattern mask, is cut into a surface by means of a beam of ions with energies in the 1,000 to 75,000 electron volt range. Patterns including elements 1 micron wide have been reliably produced in thin films on metallic insulating and semiconducting substrates using photolithographic masking techniques.

13 Claims, 1 Drawing Figure

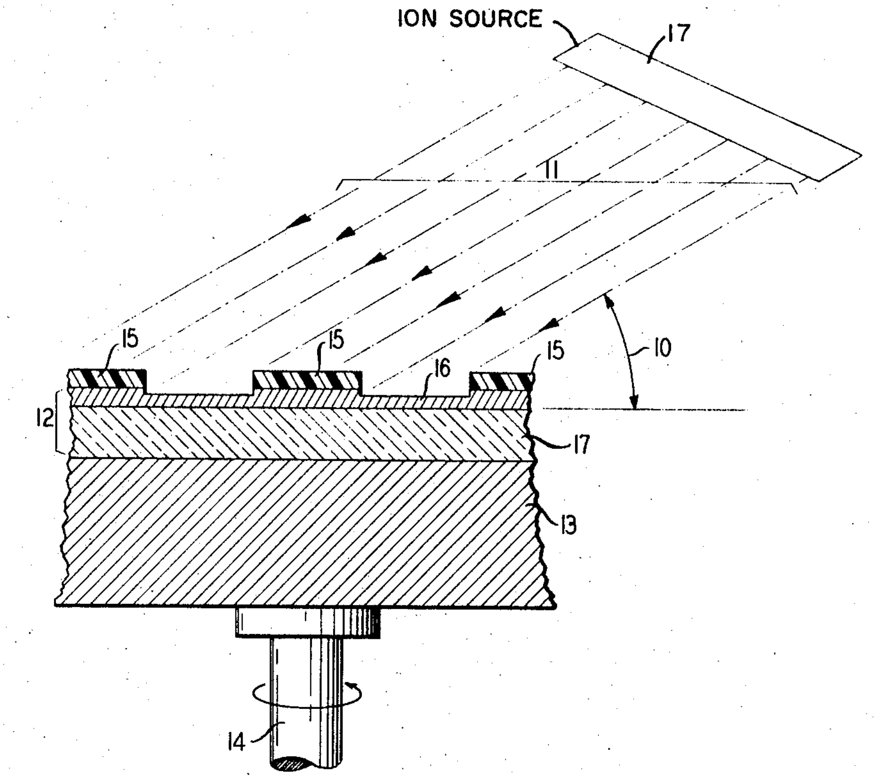
ION SOURCE
17
11
15
15
16
15
10
12
17
13
14

ION ETCHING THROUGH A PATTERN MASK

BACKGROUND OF THE INVENTION

1. Field of the Invention

Patterns are cut into surfaces incorporated in high density magnetic memories and other miniaturized electromagnetic signal processing devices.

2. Description of the Prior Art

The etching of patterns on solid surfaces has become of primary importance in the field of miniaturized electromagnetic signal processing devices. In the field of integrated circuitry it is necessary to accurately etch patterns in deposited films of both insulating and metallic materials. This is done primarily through the use of photolithographically produced masks and chemical etchants. As the desired circuit element packing density becomes higher and higher, the inherent problems of this technology become apparent. Chemical etchants tend to undercut the photolithographic masks producing dimensional uncertainties and irregular edges. When the lateral dimensions of the patterns being produced become as small as the film thickness, these problems become the dominant limitation on further miniaturization. In addition to these mechanical considerations, chemical etchants bring with them the problems of chemical compatibility with the various materials present and of the removal of reaction products.

Some of the chemical problems can be avoided by a process variously known as sputter-etching and back sputtering. In this process the device to be etched is placed in a chamber containing a gas such as argon under low pressure. A plasma is produced in the chamber and positive ions from the plasma are caused to strike the device surface, physically removing the desired material. If the device is a conductor, the plasma is produced by, first, imposing several thousand volts between the device and an anode electrode. An electron gun is then used to ionize some of the gas atoms and initiate a plasma discharge. If the sample is an insulator, the plasma is produced by a large RF field produced in the chamber. This process, while chemically clean, produces heating of the device being etched. This heating is accentuated by the fact that the incident ions have a broad energy spectrum. The low energy ions heat the device without removing material. In addition, the ions in the plasma are scattered many times before striking the surface and thus strike the surface at a large variety of angles, thereby limiting the fidelity of the etched patterns.

SUMMARY OF THE INVENTION

It has been demonstrated that high quality thin film patterns on an extremely small scale can be produced through the use of an energetically controlled beam of ions, parallel to within ±5°, in conjunction with conventional masking techniques. Patterns including stripes less than 1 micron wide have been reliably and reproducibly made. This small scale, for instance, allows the fabrication of magnetic bubble memory and logic devices with a bit density of $10^7$ bits per square inch.

In this process an energetically controlled beam of ions, parallel to within ±5°, is produced by an ion gun within which the ions are accelerated by a large DC voltage. The magnitude of this voltage can be adjusted for the desired material removal rate in view of the particular material being removed. The emerging ion beam is essentially free of low energy ions which tend to heat the device without removing material. The lowest energy ions possess energies roughly equal to the acceleration voltage while multiply ionized ions will possess multiples of this energy.

The ion beam is made incident on the device being etched within a vacuum chamber. Pressure in the chamber is kept sufficiently low (less than $10^{-2}$ Torr) such that scattering of the ions is minimal and the ions strike the surface at the predetermined angle. The device may be situated on a stage capable of rotation, translation and angular adjustment relative to the position of the ion beam. This process is essentially independent of the composition of the device being etched although the accelerating voltage and the angle of incidence can be adjusted for the desired removal rate and definition. The process will etch conductors, insulators, or composite bodies consisting of conducting or insulating thin films deposited on conducting or insulating substrates. The required patterns can be defined by photolithographic masking techniques or by removable masks.

BRIEF DESCRIPTION OF THE DRAWING

The FIGURE is an elevational view in cross section of a device being ion etched while mounted on a stage capable of rotation.

DETAILED DESCRIPTION OF THE INVENTION

Ion Beam Bombardment

The FIGURE shows a device in the process of being etched. The ion beam 11 is incident on the device 12 and pattern mask 15 at the preselected angle 10 the beam being produced by the ion source 17 (E. G. Spencer et al., *Journal of Vacuum Science and Technology*, 8, [197] page S52). The device is mounted on a stage 13 which is capable of translation and rotation about an axis 14 perpendicular to the device surface at the position of incidence of the ion beam. The device 12 is shown, by way of example, as a metallic film 16 on a ceramic substrate 17. However, the inventive etching process can be applied to a unitary rigid body of any composition or a composite rigid body of any combination of compositions. The substrate 17 can be a temporary backing plate for a removable film device 16.

The speed of material removal by the ions of the ion beam varies with a number of factors. Since the material is removed primarily by momentum transfer from the ions to the atoms of the surface and not by the heating of the surface above the vaporization temperature, the accelerating voltage of the ion gun must be sufficient that each ion is able to overcome the binding energy of the atoms being struck. As the accelerating voltage is increased, the average number of surface atoms dislodged per incident ion (referred to hereafter as the dislodging coefficient) increases. Inordinately high acceleration potentials can produce crystalline subsurface damage which will degrade the performance of some classes of devices. The particular voltages which would be considered too low or too high of course depend upon the particular materials being etched. In view of the above, acceleration voltages less than 1,000 volts or greater than 75,000 volts are usually not useful. Greatest convenience and control over the material removal rate usually results from the use of acceleration voltages between 2,500 and 15,000 volts.

The angle of incidence (denoted by 10 in the FIGURE) also affects the dislodging coefficient. Angles between 10° and 45° usually result in larger dislodging coefficients and less subsurface damage than angles closer to 90°. However, 90° incidence usually results in better edge definition.

Another factor influencing the dislodging coefficient is the ion species used. Since the dislodging process is primarily a momentum transfer process, more massive ions will generally possess larger dislodging coefficients than less massive ions of the same energy. Species which are gaseous at room temperature are most convenient to use although the use of other species requiring vapor producing heaters is also conceivable for special purposes. Of the gaseous species, the noble gases He, Ne, Ar, Kr, and Xe are most generally advantageous since they do not react chemically with the device being etched and can easily be removed from the system after collision. Of these, argon is most widely used. However, it is definitely possible to use the reactive gases in this process. Oxygen has been tried to advantage.

Masking

The most widely used masking process in the microminiature device art is the photolithographic process. In this process the surface to be etched is covered by a polymer layer. Portions of the layer are caused to crosslink by exposure to light and the uncrosslinked portions are subsequently washed away during the developing step. An additional step, which is sometimes performed when photolithography is used in conjunction with chemical etchants but is more advantageous in conjunction with the instant ion beam process, is a prebaking step. In this prebaking step the polymer layer is heated in order to harden it by, perhaps, driving off any water remaining after the development step. In selecting the thickness of the photolithographic polymer to be used, it must be remembered that during ion bombardment the mask material is removed at roughly the same rate as the exposed surface material. The skilled practitioner will choose a polymer thickness such that the polymer does not disappear before the surface is etched to the desired depth.

The skilled practitioner will recognize that the processing of some classes of devices will require the use of removable masks such as metal foil masks. This may be necessary if, for instance, the surface is not compatible with the photolithographic chemicals. The use of removable masks will result in a completely dry process with a minimum of device handling.

EXAMPLES

The disclosed process is nearly universal in nature. It can be applied to any material which is not degraded by the required degree of vacuum within the bombardment chamber. The process can be used for etching depressions in crystalline or amorphous insulators, semiconductors, or metals, or holes in thin bodies of these materials. Patterns of such depressions in insulators or semiconductors are required, for instance, for subsequent metal depositions needed for "buried conductor" device techniques. The technique is most widely used at present for cutting patterns in thin deposited layers. Such patterns on semiconducting substrates are widely used in monolithic microminiature circuitry. Patterns of semiconductors and magnetic metals on insulating substrates are employed, for instance, in magnetic bubble memory and signal processing devices. Tantalum thin films on glass and ceramic substrates are used in integrated circuitry.

For the magnetic bubble device use, patterns of permalloy on glass substrates have been produced as overlays for magnetic bubble shift registers. One such shift register pattern has a 7.5 micron periodicity and is composed principally of stripes 0.8 microns wide produced from a film 0.6 microns thick. A 1,000 bit shift register has been produced whose overall dimension is 0.010 inches square. The bit density of this shift register is $10^7$ bits per square inch. This has been accomplished using photolithography including a prebaking. The ion bombardment took place at an angle of 30° and an accelerating potential of 7,000 volts.

What is claimed is:

1. Method for the production of a pattern of voids in a surface of a rigid body comprising:

a. applying to the surface a pattern mask thereby producing a covered portion of the surface and an exposed portion of the surface, and b. removing material from the exposed portion of the surface by means of a removal agent CHARACTERIZED IN THAT the removal agent consists of a beam of ions which ions are parallel to within ±5° and possess energies greater than 1,000 electron volts, which beam is incident so as to strike both the pattern mask and the exposed portion of the surface.

2. A method of claim 1 in which the rigid body comprises a substrate and a surface layer and in which the removed material comprises all of the surface layer beneath the exposed portion of the surface.

3. A method of claim 2 in which the surface layer is a metal and the substrate is an insulator.

4. A method of claim 3 in which the metal is a ferromagnetic metal and the insulator is a nonmetallic magnetic material.

5. A method of claim 2 in which the surface layer is a semiconducting material.

6. A method of claim 1 in which the pattern mask is produced directly on the surface by a photolithographic process.

7. A method of claim 6 in which the photolithographic process includes heating the developed pattern mask in order to harden it.

8. A method of claim 1 in which the pattern mask is a separate and removable mask.

9. A method of claim 1 in which the beam is incident on the surface at at least one preselected angle which at least one preselected angle lies between 10° and 45° as measured from the surface to the beam.

10. A method of claim 1 in which the beam is incident on the surface at an angle of essentially 90° as measured from the surface to the beam of ions.

11. A method of claim 1 further comprising rotating the solid body about an axis which is perpendicular to the surface at the position of incidence of the beam of ions.

12. A method of claim 1 in which the ions are species selected from the group consisting of argon, helium, neon, krypton, and xenon.

13. A method of claim 1 in which the ions possess energies between 1,000 electron volts and 75,000 electron volts.

* * * * *